US007401416B2

(12) United States Patent
Brooks (10) Patent No.: US 7,401,416 B2
(45) Date of Patent: Jul. 22, 2008

(54) SYSTEM FOR MEASURING AND CUTTING (76) Inventor: Mark B. Brooks, 6609 Butcher Branch, Hillsboro, MO (US) 63050

( * ) Notice: Subject to any disclaimer, the term of this patent is extended or adjusted under 35 U.S.C. 154(b) by 0 days.

(21) Appl. No.: 11/469,922

(22) Filed: Sep. 5, 2006

(65) Prior Publication Data

US 2008/0052943 A1 Mar. 6, 2008

(51) Int. Cl.
*G01B 3/10* (2006.01)
*B25H 7/00* (2006.01)
*B26D 5/20* (2006.01)

(52) U.S. Cl. ............................ 33/760; 33/770; 33/763; 33/666; 33/630; 83/76.9; 83/490; 83/471.3

(58) Field of Classification Search .................. 33/760, 33/755, 758, 759, 761–763, 768–770, 666–679, 33/574, 579, 628, 630, 640; 83/76.9, 490, 83/471.3, 486, 522.15–522.25; 7/158, 163, 7/164
See application file for complete search history.

(56) References Cited

U.S. PATENT DOCUMENTS

| 4,181,960 | A | | 1/1980 | Tateishi et al. | |
|---|---|---|---|---|---|
| 4,275,504 | A | * | 6/1981 | Chontos | 33/759 |
| 4,366,632 | A | * | 1/1983 | Bente | 36/67 D |
| 4,965,941 | A | * | 10/1990 | Agostinacci | 33/668 |
| 5,136,285 | A | * | 8/1992 | Okuyama | 340/870.11 |
| 5,197,365 | A | * | 3/1993 | Clifton | 83/468 |
| 5,426,863 | A | | 6/1995 | Biggel | |
| 5,433,014 | A | | 7/1995 | Falk et al. | |
| 5,444,635 | A | * | 8/1995 | Blaine et al. | 700/171 |
| 5,894,678 | A | * | 4/1999 | Masreliez et al. | 33/762 |
| 6,178,655 | B1 | * | 1/2001 | Potter et al. | 33/668 |
| 6,434,854 | B1 | * | 8/2002 | MacColl et al. | 33/668 |
| 6,513,261 | B2 | * | 2/2003 | Johnson | 33/668 |
| 6,658,755 | B2 | * | 12/2003 | Arlinsky | 33/760 |
| 7,165,338 | B2 | * | 1/2007 | Clifton | 33/640 |
| 2001/0000856 | A1 | * | 5/2001 | O'Banion | 83/76.9 |

* cited by examiner

*Primary Examiner*—Cristopher W. Fulton
*Assistant Examiner*—Amy Cohen Johnson
(74) *Attorney, Agent, or Firm*—Dale J. Ream (57) ABSTRACT

A system for measuring and cutting includes a portable measuring unit and a cutting unit. The measuring unit includes a transmitter and a measuring processor in communication with the transmitter. The measuring unit includes a first retractable tape measure having a first variable resistance wire and a sensor, the measuring processor having programming for determining first distance data and for transmitting that data. The cutting unit includes a saw and a receiver for receiving the first distance data transmitted from the measuring unit. The cutting unit includes a second tape measure with a second variable resistance wire, sensor, and processor for determining a second distance. When the second distance measurement is equal to the first distance measurement, an indicator is actuated so the user knows to actuate the saw to cut the workpiece. The system, therefore, eliminates inaccurate measurements and the need to remember or record measurements.

16 Claims, 7 Drawing Sheets

SYSTEM FOR MEASURING AND CUTTING

BACKGROUND OF THE INVENTION

This invention relates generally to tools and, more particularly, to a system for measuring and recording measurements without having to write down the measurement and for cutting a work piece according to the recorded measurement.

The traditional method for measuring and cutting work materials, such as boards, is to measure, to commit the measurement to memory or record in writing on the work piece itself or even one's hand, and then to cut the work piece according to the measurement. As any construction worker knows all too well, it is often the case that a measurement is either not remembered, improperly recorded, or not understood by another person whose task it is to actually cut it. Frequently, the noisy environment of a construction site contributes to the problems of accurately taking, communicating, or actually cutting the work piece. In addition, the act of actually measuring a work piece with a tape measure is problematic due to human error.

Therefore, it would be desirable to have a system for measuring and cutting work pieces that eliminates the need to write down or remember a measurement. Further, it would be desirable to have a measuring and cutting system that would eliminate the possibility of an inaccurate measurement from a tape measure. In addition, it would be desirable to have a measuring and cutting system that decreases the time it takes to measure and cut a work piece.

SUMMARY OF THE INVENTION

A system for measuring and cutting according to the present invention includes a portable measuring unit and a cutting unit. The measuring unit includes means for measuring first distance data, namely, the length on a workpiece at which a cut is desired to be made. The measuring unit may further include a transmitter and a measuring processor in data communication with the transmitter and the means for determining the first distance data. The measuring processor includes programming for transmitting the first distance data. The means for measuring that first distance data may include a retractable tape measure utilizing a variable resistance wire, sensor, and programming for determining a length. Other means for determining the first distance data will also be discussed below.

The cutting unit includes a saw, a receiver for receiving the first distance data transmitted by the transmitter, and means for determining a second distance data. The means for determining a second distance may utilize another variable resistance wire or other technology and enables a user to again measure and properly position the workpiece on the saw to be cut at the measurement that was transmitted from the measuring unit to the cutting unit. The cutting unit includes an indicator—which may be audible or visual or both—for indicating when the second distance measurement is the same as the first distance measurement. When this is the case, it means that the workpiece is properly positioned to be cut to the desired measurement and the saw may be actuated. It is understood that the indicator may also be mechanical, such as a mechanical brake.

Therefore, a general object of this invention is to provide a system for measuring and cutting that eliminates the traditional practice of remembering or writing down a measurement of a workpiece to be cut.

Another object of this invention is to provide a system for measuring and cutting, as aforesaid, which eliminates human error associated with properly measuring a distance along a workpiece.

Still another object of this invention is to provide a system for measuring and cutting, as aforesaid, that transmits a measurement from a portable measuring unit directly to a remote cutting unit.

Yet another object of this invention is to provide a system for measuring and cutting, as aforesaid, that provides an audible or visual indication when the cutting unit is aligned at a measurement along the workpiece equal to the measurement made by the portable measuring unit.

A further object of this invention is to provide a system for measuring and cutting, as aforesaid, that may be used to accurately measure and cut a workpiece in a noisy environment.

A still further object of this invention is to provide a system for measuring and cutting, as aforesaid, that is cost-effective to manufacture and user-friendly to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a sectional view taken along line 3b-3b of FIG. 3a;

FIG. 4b is a sectional view taken along line 4b-4b of FIG. 4a;

FIG. 5b is a side view of the cutting device as in FIG. 5a;

FIG. 6a is a front view of the cutting device as in FIG. 5a;

FIG. 6b is an isolated view on an enlarged scale taken from FIG. 6a; and

DESCRIPTION OF THE PREFERRED EMBODIMENT

A system for measuring and cutting 100 according to the present invention will now be described in detail with reference to FIGS. 1 through 7 of the accompanying drawings.

More particularly, a system for measuring and cutting 100 according to the current invention includes a portable measuring unit 110 and a cutting unit 140.

The portable measuring unit 110 (FIGS. 1-4b and 7) includes a transmitter 112, means for determining first distance data, and a processor 114 (also referred to herein as a "measuring processor") in data communication with the transmitter 112 and the means for determining first distance data. More particularly, the means for determining first distance data may include a retractable tape measure 116 (also referred to herein as a "first retractable tape measure") having an outermost end 116a and a length and means for determining the extension of the tape measure 116. The means for determining the extension of the tape measure 116 may include, for example: an optical encoder that counts holes in the tape measure 116 as they pass over the encoder; a roller placed against the tape measure 116 and a counter for counting the number of revolutions of the roller; or a variable resistance wire 117 (also referred to herein as a "first variable resistance wire") coupled to the tape measure 116 and extending the length of the tape measure 116, a sensor 118 (also referred to herein as a "first sensor") for detecting a resistance of a portion of the wire 117 adjacent the sensor 118 (FIG. 4b), and programming in the measuring processor 114 for associating the resistance detected by the sensor 118 with the first distance data. The sensor 118 may be in data communication with the measuring processor 114, and the portion of the wire 117 adjacent the sensor 118 may be selectively variable. In other words, as the tape measure 116 is extended or retracted, the portion of the wire 117 that is adjacent the sensor 118 will change. The processor 114 may associate the first distance data with the resistance detected by the sensor 118 using a predetermined formula or correlation, for example.

Figure 1:
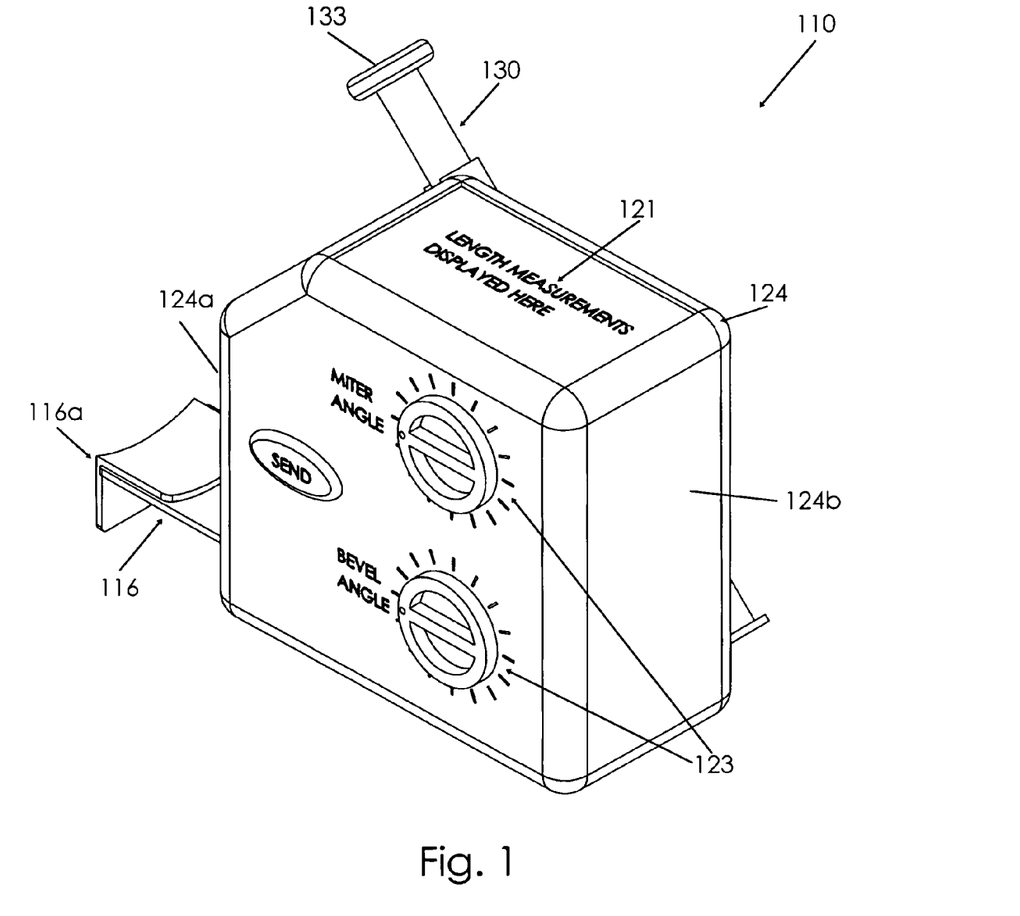
FIG. 1 is a perspective view of a measuring device of a system for measuring and cutting according to a preferred embodiment of the present invention.
Figure 2A:
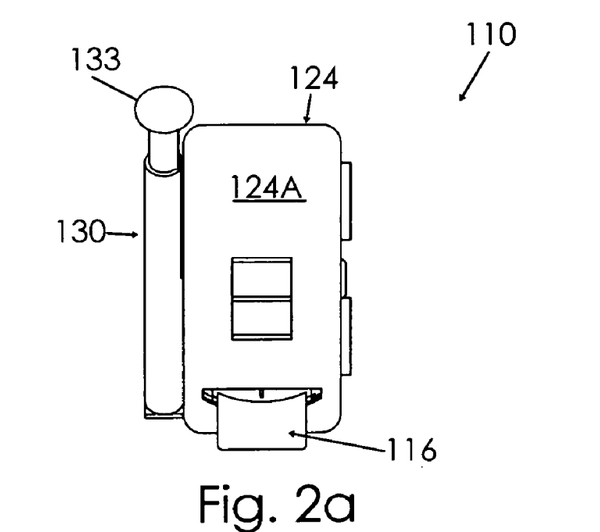
FIG. 2a is a front view of the measuring device as in FIG. 1.
Figure 2B:
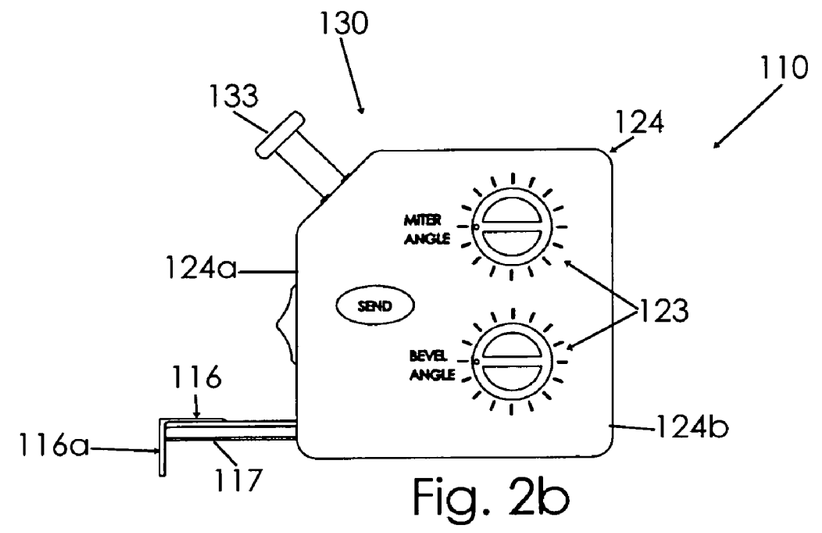
FIG. 2b is a side view of the measuring device as in FIG. 1.
Figure 7:
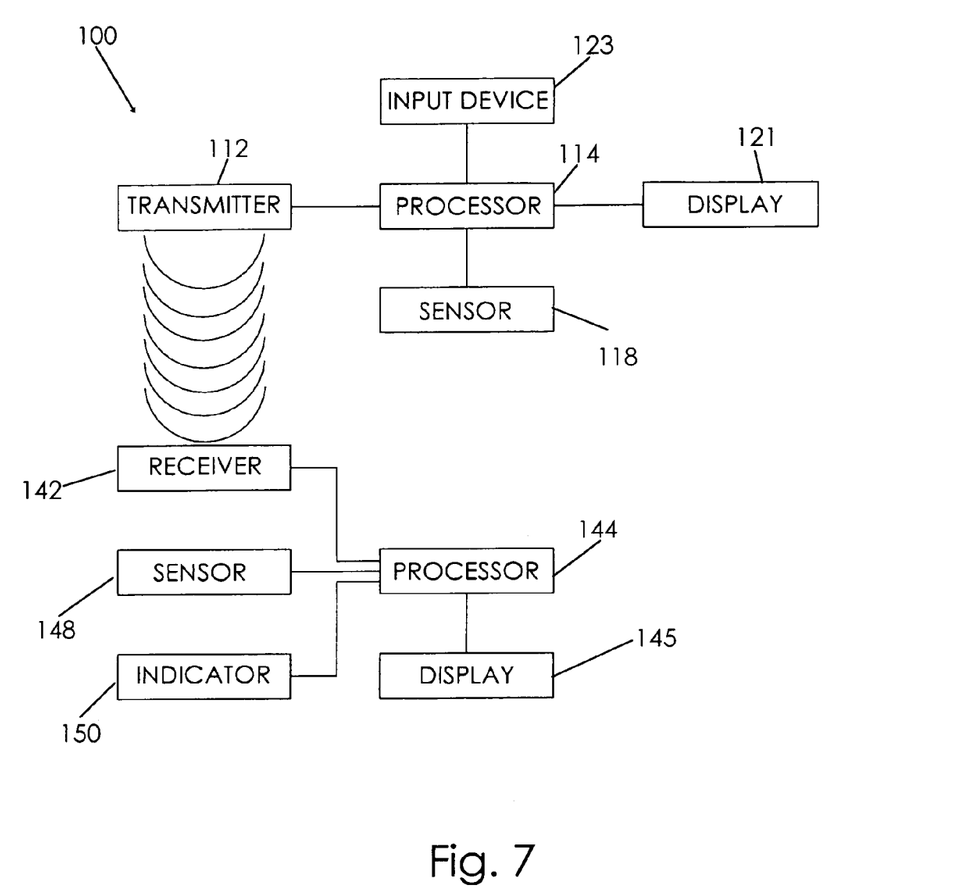
FIG. 7 is a block diagram of the system for measuring and cutting according to the preferred embodiment of the present invention.

As shown in FIGS. 1 and 7, a display 121 may be in data communication with the measuring processor 114 to display the first distance data, and an input device 123 may be in data communication with the measuring processor 114 to obtain saw adjustment data from a user. The measuring processor 114 may have programming for actuating the transmitter 112 to transmit the first distance data, programming for actuating the display 121 to present the first distance data thereon, and/or programming for actuating the transmitter 112 to transmit the saw adjustment data.

A housing 124 may contain the transmitter 112 and the measuring processor 114. The housing 124 may have front and rear sides 124a, 124b, and the tape measure outermost end 116a may be closer to the housing front side 124a than to the housing rear side 124b. The first distance data may correspond to a distance from the tape measure outermost end 116a to the housing rear side 124b (allowing the housing to abut one measurement surface), or the first distance data may correspond to a distance from the tape measure outermost end 116a to another predetermined point (e.g., the housing front side 124a).

Figure 3A:
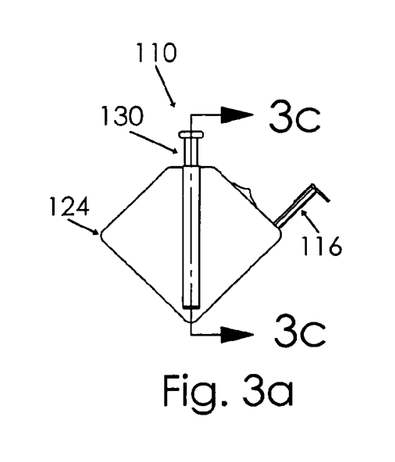
FIG. 3a is a side view of the measuring device as in FIG. 1 from another angle and with a marker in a retracted configuration.
Figure 3B:
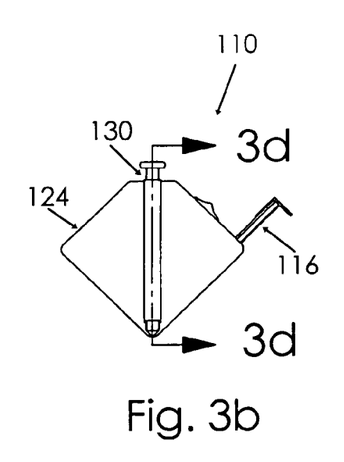
Figure 3C:
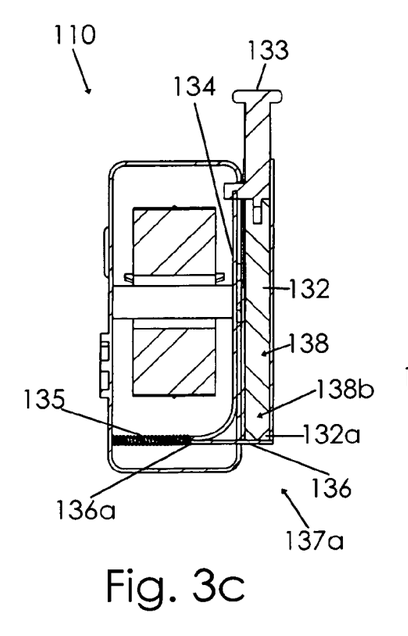
FIG. 3c is a side view of the measuring device as in FIG. 1 from another angle and with a marker in an extended configuration.
Figure 3D:
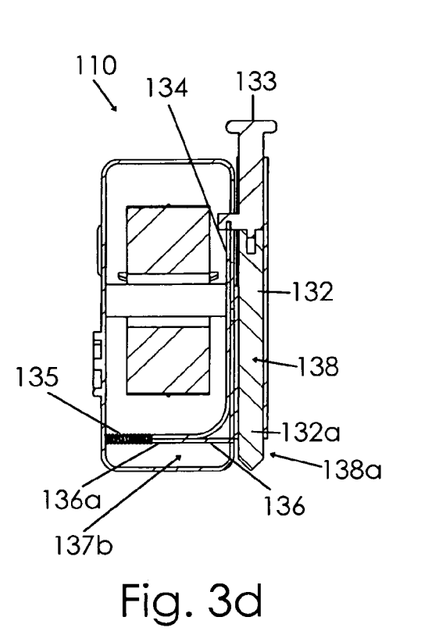
FIG. 3d is a sectional view taken along line 3d-3d of FIG. 3c.
Figure 4A:
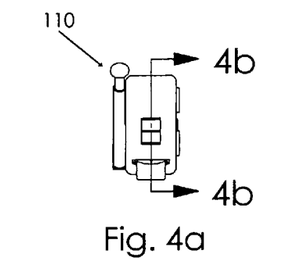
FIG. 4a is another front view of the measuring device as in FIG. 1.
Figure 4B:
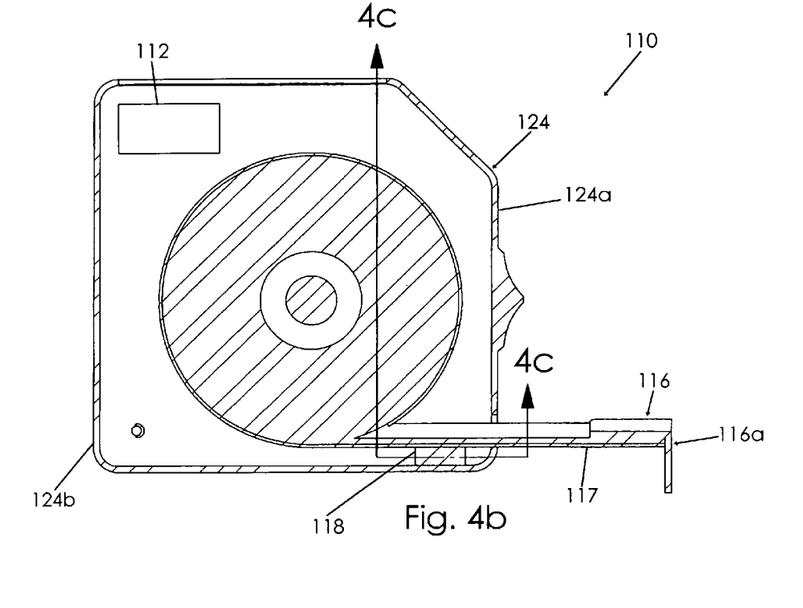
Figure 4C:
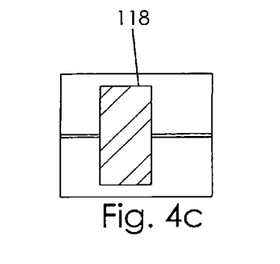
FIG. 4c is a sectional view taken along line 4c-4c of FIG. 4b.
Figure 5A:
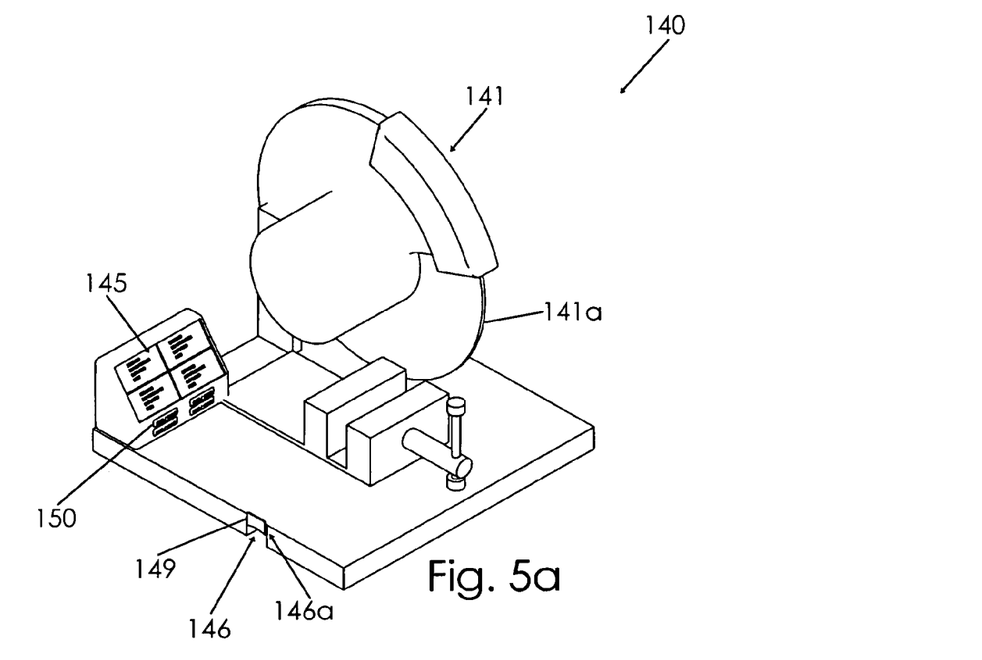
FIG. 5a is a perspective view of a cutting device of the system for measuring and cutting according to the preferred embodiment of the present invention.
Figure 5B:
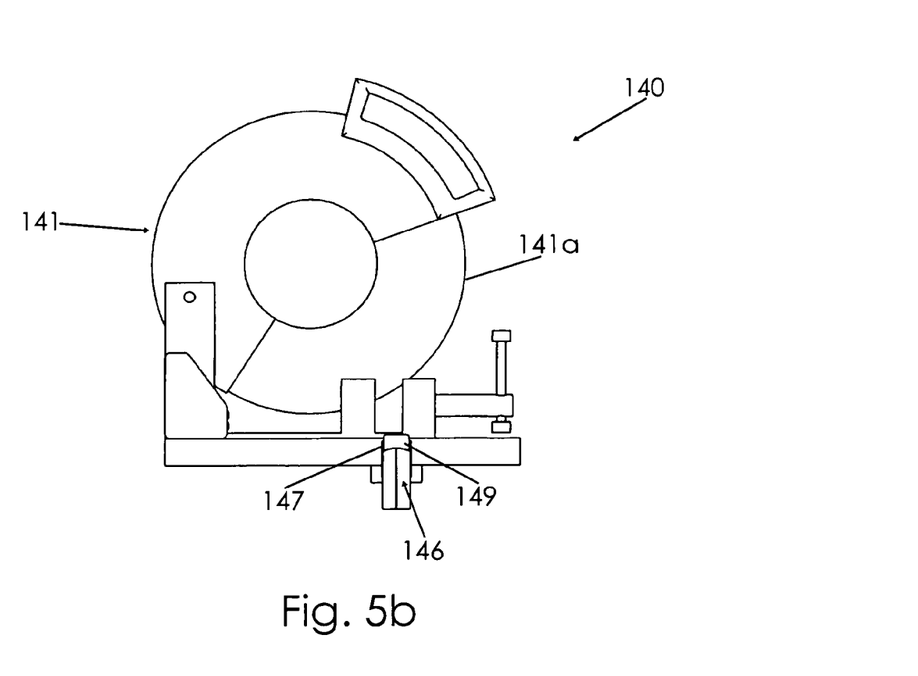
Figure 6A:
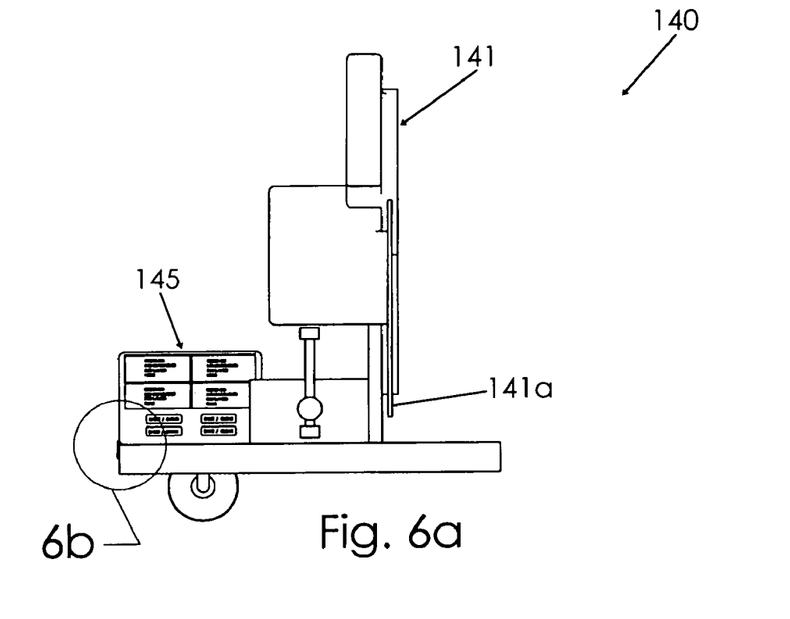
Figure 6B:
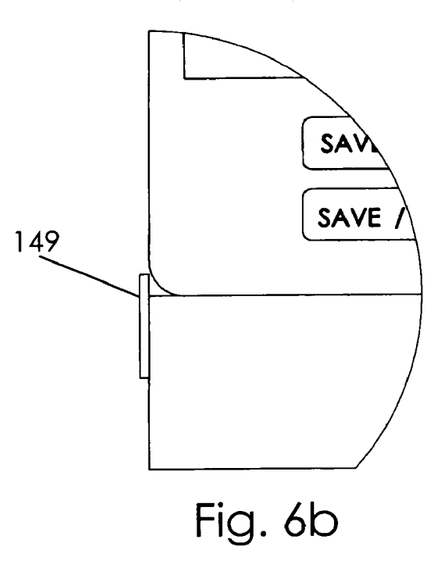

As best shown in FIGS. 3a through 3d, the measuring unit 110 may include a marking apparatus 130. The marking apparatus 130 may have a marker cavity 132 with an open lower end 132a. A pushbutton 133 may be operatively coupled to a flexible member 134, and one end 134a of the flexible member 134 may be operatively coupled to a spring 135 for compressing the spring 135 when the pushbutton 133 is pressed. A door 136 may have one end 136a operatively coupled to the spring 135 for movement between a closed configuration 137a when the spring 135 is extended (FIG. 3c) and an open configuration 137b when the spring 135 is compressed (FIG. 3d). A marker 138 may be operatively coupled to the pushbutton 133 so that the marker 138 is movable between an extended configuration 138a when the pushbutton 133 is pressed and the door 136 is at the open configuration 137b (FIG. 3d) and a retracted configuration 138b when the pushbutton 133 is released and the door 136 is at the closed configuration 137a (FIG. 3c). The marker 138 may be, for example, a graphite marker, a chalk marker, or an ink marker, and though not shown in the drawings, the marker 138 may be removable or may have a removable tip to selectively accommodate situations needing graphite, chalk, or ink.

The cutting unit 140 (FIGS. 5a-7) includes a saw 141, a receiver 142 for receiving the first distance data from the transmitter 112, and a cutting processor 144 in data communication with the receiver 142. A display 145 for presenting the first distance data may be in data communication with the cutting processor 144, and the cutting processor 144 may have programming for actuating the display 145 to present the first distance data. Means for determining second distance data may be in data communication with the cutting processor 144. More particularly, the means for determining second distance data may include a retractable tape measure 146 (also referred to herein as a "second retractable tape measure") having an outermost end 146a and a length and means for determining the extension of the tape measure 146. The outermost end 146a may have a clip 149 for interacting with a workpiece. The means for determining the extension of the tape measure 146 may include, for example: an optical encoder that counts holes in the tape measure 146 as they pass over the encoder; a roller placed against the tape measure 146 and a counter for counting the number of revolutions of the roller; or a variable resistance wire 147 (also referred to herein as a "second variable resistance wire") coupled to the tape measure 146 and extending the length of the tape measure 146, a sensor 148 (also referred to herein as a "second sensor") for detecting a resistance of a portion of the wire 147 adjacent the sensor 148, and programming in the cutting processor 144 for associating the resistance detected by the sensor 148 with the second distance data. The sensor 148 may be in data communication with the cutting processor 144, and the portion of the wire 147 adjacent the sensor 148 may be selectively variable. In other words, as the tape measure 146 is extended or retracted, the portion of the wire 147 that is adjacent the sensor 148 will change. The processor 144 may associate the second distance data with the resistance detected by the sensor 148 using a predetermined formula or correlation, for example.

As shown in FIGS. 5a through 6b, the saw 141 may include a saw blade 141a (though the blade shown in the drawings is a rotary saw blade, the blade may alternately be a band saw blade, a reciprocating saw blade, etc.) and a saw adjustment mechanism (e.g., gearing for changing the angle of the saw blade 141a, etc.). The second distance data preferably corresponds to a distance from the second tape measure outermost end 146a to the saw blade 141a. The cutting processor 144 may be in data communication with the saw adjustment mechanism, and the cutting processor 144 may have programming for actuating the saw adjustment mechanism to automatically adjust the saw 141 in accordance with the saw adjustment data obtained by the receiver 142 from the transmitter 112. The cutting processor 144 may additionally or alternately have programming for actuating the display 145 to present the second distance data.

An indicator 150 may be in data communication with the cutting processor 144, and the cutting processor 144 may have programming for actuating the indicator 150 when the first distance data is equal to the second distance data (FIG. 7). The indicator 150 may be the display 145, another visual indicator (e.g., a LED), an audible alarm, and/or another device that provides information to a user.

In use, a user may measure a length between two points and obtain corresponding first distance data by extending the outermost end 116a of the first tape measure 116 to one point and placing the housing rear side 124b at the second point. The first sensor 118 may detect the resistance of the portion of the wire 117 that is adjacent the first sensor 118, and the measuring processor 114 may associate the resistance detected by the sensor 118 with the first distance data as described above. The measuring processor 114 may actuate the first display 121 to present the first distance data, and the measuring processor 114 may actuate the transmitter 112 to send the first distance data to the receiver 142. The user may provide saw adjustment data (e.g., miter angle, bevel angle, etc.) through the input device 123, and the measuring processor 114 may actuate the transmitter 112 to send the saw adjustment data to the receiver 142. To mark a workpiece, the user may push the pushbutton 133, causing the flexible member 134 to compress the spring 135, the spring 135 to open the door 136, and the marker 138 to extend through the open lower end 132a of the marker cavity 132 to mark the workpiece, as described above and best shown in FIGS. 3a through 3d.

The receiver 142 of the cutting unit 140 may receive the first distance data and the saw adjustment data from the transmitter 112. The cutting processor 144 may actuate the second display 145 to present the first distance data, and the saw adjustment mechanism may automatically adjust the saw 141 (e.g., the bevel angle or the miter angle) in accordance with the saw adjustment data. A workpiece may be passed across the saw 141 so that it catches the clip 149, causing the tape measure 146 to extend. The second sensor 148 may detect the resistance of the portion of the wire 147 that is adjacent the second sensor 148, and the cutting processor 144 may associate the resistance detected by the second sensor 148 with the second distance data as described above. The cutting processor 114 may actuate the second display 145 to present the second distance data, and the cutting processor 144 may actuate the indicator 150 when the first distance data is equal to the second distance data, signaling to the user that the workpiece is at the appropriate length for cutting. If the workpiece was marked as described above, the mark may be used to confirm the cutting location.

It is understood that while certain forms of this invention have been illustrated and described, it is not limited thereto except insofar as such limitations are included in the following claims and allowable functional equivalents thereof.

What is claimed is as follows:

1. A system for measuring and cutting, comprising:
  a portable measuring unit, comprising:
    means for determining first distance data;
    a transmitter; and
    a measuring processor in data communication with said transmitter and said means for determining first distance data, said measuring processor having programming for actuating said transmitter to transmit said first distance data;
  a cutting unit, comprising:
    a saw;
    a receiver for receiving said first distance data transmitted from said transmitter;
    means for determining second distance data;
    an indicator;
    a cutting processor in data communication with said receiver, said means for determining second distance data, and said indicator;
    said processor having programming for actuating said indicator when said first distance data is equal to said second distance data;
  wherein said measuring unit further comprises a marking apparatus, said marking apparatus comprising:
    a marker cavity having an open lower end;
    a pushbutton operatively coupled to a flexible member, said flexible member having one end operatively coupled to a spring for compressing said spring when said pushbutton is pressed;
    a door having one end operatively coupled to said spring for movement between a closed configuration when said spring is extended and an open configuration when said spring is compressed; and
    a marker operatively coupled to said pushbutton, said marker being movable between an extended configuration when said pushbutton is pressed and said door is at said open configuration and a retracted configuration when said pushbutton is released and said door is at said closed configuration.

2. The system of claim 1, wherein:
  a display is in data communication with said measuring processor; and
  said measuring processor has programming for actuating said display to present said first distance data.

3. The system of claim 1, wherein said means for determining first distance data includes:
  a retractable tape measure having an outermost end and a length;
  a variable resistance wire coupled to said tape measure and extending said length of said tape measure;
  a sensor for detecting a resistance of a portion of said wire adjacent said sensor, said sensor being in data communication with said measuring processor, said portion of said wire adjacent said sensor being selectively variable; and
  programming in said measuring processor for associating said resistance detected by said sensor with said first distance data.

4. The system of claim 3, wherein:
  a housing contains said transmitter and said measuring processor;
  said housing has front and rear sides;
  said tape measure outermost end is closer to said housing front side than to said housing rear side; and
  said first distance data corresponds to a distance from said tape measure outermost end to said housing rear side.

5. The system of claim 1, wherein:
  said portable measuring unit includes an input device in data communication with said measuring processor to obtain saw adjustment data;
  said measuring processor has programming for actuating said transmitter to transmit said saw adjustment data to said receiver;
  said saw includes a saw adjustment mechanism;
  said cutting processor is in data communication with said saw adjustment mechanism; and
  said cutting processor has programming for actuating said saw adjustment mechanism to automatically adjust said saw in accordance with said saw adjustment data.

6. The system of claim 1, wherein said means for determining second distance data includes:
  a retractable tape measure having an outermost end and a length, said outermost end having a clip for interacting with a workpiece;
  a variable resistance wire coupled to said tape measure and extending said length of said tape measure;

a sensor for detecting a resistance of a portion of said wire adjacent said sensor, said sensor being in data communication with said cutting processor, said portion of said wire adjacent said sensor being selectively variable; and programming in said cutting processor for associating said resistance detected by said sensor with said second distance data.

7. The system of claim 6, wherein:

said saw includes a saw blade; and said second distance data corresponds to a distance from said tape measure outermost end to said saw blade.

8. The system of claim 1, wherein said marker is selected from the group consisting of a graphite marker, a chalk marker, and an ink marker.

9. The system of claim 1, wherein:

said saw includes a display for presenting at least one of said first distance data and said second distance data, said display being in data communication with said cutting processor; and said cutting processor includes programming for actuating said display to present at least one of said first distance data and said second distance data.

10. The system of claim 1, wherein:

said means for determining first distance data includes:
  a first retractable tape measure having an outermost end and a length;
  a first variable resistance wire coupled to said first tape measure and extending said length of said first tape measure;
  a first sensor for detecting a resistance of a portion of said first wire adjacent said first sensor, said first sensor being in data communication with said measuring processor, said portion of said first wire adjacent said first sensor being selectively variable; and
  programming in said measuring processor for associating said resistance detected by said first sensor with said first distance data;

said means for determining second distance data includes:
  a second retractable tape measure having an outermost end and a length, said outermost end having a clip for interacting with a workpiece;
  a second variable resistance wire coupled to said second tape measure and extending said length of said second tape measure;
  a second sensor for detecting a resistance of a portion of said second wire adjacent said second sensor, said second sensor being in data communication with said cutting processor, said portion of said second wire adjacent said second sensor being selectively variable; and
  programming in said cutting processor for associating said resistance detected by said second sensor with said second distance data.

11. The system of claim 10, wherein:

a housing contains said transmitter and said measuring processor;

said housing has front and rear sides;

said first tape measure outermost end is closer to said housing front side than to said housing rear side;

said first distance data corresponds to a distance from said first tape measure outermost end to said housing rear side;

said saw includes a saw blade; and said second distance data corresponds to a distance from said second tape measure outermost end to said saw blade.

12. A system for measuring and cutting, comprising:

a portable measuring unit, comprising:
  a transmitter;
  a measuring processor in data communication with said transmitter;
  a first retractable tape measure having an outermost end and a length;
  a first variable resistance wire coupled to said first tape measure and extending said length of said first tape measure;
  a first sensor for detecting a resistance of a portion of said first wire adjacent said first sensor, said first sensor being in data communication with said measuring processor, said portion of said first wire adjacent said first sensor being selectively variable;
  programming in said measuring processor for associating said resistance detected by said first sensor with first distance data; and
  programming in said measuring processor for actuating said transmitter to transmit said first distance data;

a cutting unit, comprising:
  a saw;
  a receiver for receiving said first distance data transmitted from said transmitter;
  a display for presenting said first distance data; and
  a cutting processor in data communication with said receiver and said display for actuating said display to present said first distance data;

wherein said measuring unit further comprises a marking apparatus, said marking apparatus comprising:
  a marker cavity having an open lower end;
  a pushbutton operatively coupled to a flexible member, said flexible member having one end operatively coupled to a spring for compressing said spring when said pushbutton is pressed;
  a door having one end operatively coupled to said spring for movement between a closed configuration when said spring is extended and an open configuration when said spring is compressed; and
  a marker operatively coupled to said pushbutton, said marker being movable between an extended configuration when said pushbutton is pressed and said door is at said open configuration and a retracted configuration when said pushbutton is released and said door is at said closed configuration.

13. The system of claim 12, wherein said cutting unit further comprises:

a second retractable tape measure having an outermost end and a length, said outermost end having a clip for interacting with a workpiece;

a second variable resistance wire coupled to said second tape measure and extending said length of said second tape measure;

a second sensor for detecting a resistance of a portion of said second wire adjacent said second sensor, said second sensor being in data communication with said cutting processor, said portion of said second wire adjacent said second sensor being selectively variable;

programming in said cutting processor for associating said resistance detected by said second sensor with second distance data;

an indicator in data communication with said cutting processor; and programming in said cutting processor for actuating said indicator when said first distance data is equal to said second distance data.

14. The system of claim 13, wherein:

a housing contains said transmitter and said measuring processor;

said housing has front and rear sides;

said first tape measure outermost end is closer to said housing front side than to said housing rear side;

said first distance data corresponds to a distance from said first tape measure outermost end to said housing rear side;

said saw includes a saw blade; and said second distance data corresponds to a distance from said second tape measure outermost end to said saw blade.

15. The system of claim 13, wherein:

said portable measuring unit includes an input device in data communication with said measuring processor to obtain saw adjustment data;

said measuring processor has programming for actuating said transmitter to transmit said saw adjustment data to said receiver;

said saw includes a saw adjustment mechanism;

said cutting processor is in data communication with said saw adjustment mechanism; and said cutting processor has programming for actuating said saw adjustment mechanism to automatically adjust said saw in accordance with said saw adjustment data.

16. The system of claim 12, wherein:

a housing contains said transmitter and said measuring processor;

said housing has front and rear sides;

said first tape measure outermost end is closer to said housing front side than to said housing rear side; and said first distance data corresponds to a distance from said first tape measure outermost end to said housing rear side.

* * * * *